United States Patent
Rajendran et al.

(10) Patent No.: US 10,306,563 B1
(45) Date of Patent: May 28, 2019

(54) METHOD AND SYSTEM FOR DYNAMICALLY CONTROLLING TRANSMIT POWER OF A WIRELESS TRANSMITTER

(71) Applicant: Wipro Limited, Bangalore (IN)

(72) Inventors: Surendran Rajendran, Chennai (IN); Adarsh Pattar, Bijapur (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/873,682

(22) Filed: Jan. 17, 2018

(30) Foreign Application Priority Data

Nov. 30, 2017 (IN) .............................. 201741043087

(51) Int. Cl.
*H04W 52/24* (2009.01)
*H04W 52/22* (2009.01)

(52) U.S. Cl.
CPC ....... *H04W 52/243* (2013.01); *H04W 52/226* (2013.01)

(58) Field of Classification Search
None
See application file for complete search history.

(56) References Cited

U.S. PATENT DOCUMENTS

| | | | |
|---|---|---|---|
| 6,034,971 A | * | 3/2000 | Love .................... H04L 1/0009 370/342 |
| 2006/0022800 A1 | * | 2/2006 | Krishna ............... G06K 7/0008 340/10.2 |
| 2011/0223931 A1 | * | 9/2011 | Buer ........................ G01S 5/12 455/456.1 |
| 2014/0226499 A1 | * | 8/2014 | Soliman .............. H04W 52/243 370/252 |
| 2017/0243485 A1 | * | 8/2017 | Rubin ................. H04W 72/005 |

FOREIGN PATENT DOCUMENTS

WO   2011136770 A1   11/2011

* cited by examiner

*Primary Examiner* — Mohammed Rachedine
(74) *Attorney, Agent, or Firm* — Pepper Hamilton LLP

(57) ABSTRACT

A method and system for dynamically controlling transmit power of a wireless transmitter includes determining a set of sensors based on a location of each of a plurality of sensors, a location of the wireless transmitter, and a maximum range of the wireless transmitter. The method further includes determining a change in power level and a change in interference level at each of the set of sensors based on a plurality of power measurements and a plurality of interference measurements, within a predefined response time, for each of the set of sensors, determining a required change in a transmit power level of the wireless transmitter based on the change in power level and the change in interference level at each of the set of sensors, and dynamically effecting a change in the transmit power of the wireless transmitter based on the required change.

17 Claims, 4 Drawing Sheets

METHOD AND SYSTEM FOR DYNAMICALLY CONTROLLING TRANSMIT POWER OF A WIRELESS TRANSMITTER

This application claims the benefit of Indian Patent Application Serial No. 201741043087, filed Nov. 30, 2017, which is hereby incorporated by reference in its entirety.

FIELD

This disclosure relates generally to wireless transmitter, and more particularly to method and system for dynamically controlling transmit power of a wireless transmitter.

BACKGROUND

In large indoor spaces, multiple wireless transmitters may be employed and distributed widely to provide adequate coverage. As will be appreciated, each of the transmitters may have their own transmission power. Further, in some scenarios, the spectrum used by one or more transmitters may be reused by other transmitters, without the need for allocation of new spectrum. For example, there may be a scope for spatial reuse of spectrum in large indoor spaces with a relatively sparse distribution of wireless transmitters, such as aircraft and automobile factory floors. In such a scenario, the power at which a transmitter, operating in the same space as other transmitters, should transmit may depend on its position, range, and the interference from other transmitters. However, current transmit power control techniques are either silent or limited in controlling transmit power of such transmitters.

SUMMARY

In one embodiment, a method for dynamically controlling a transmit power of a wireless transmitter is disclosed. In one example, the method may include determining a set of sensors based on a location of each of a plurality of sensors, a location of the wireless transmitter, and a maximum range of the wireless transmitter. The method may further include determining a change in power level and a change in interference level at each of the set of sensors based on a plurality of power measurements and a plurality of interference measurements, within a predefined response time, for each of the set of sensors. The method further may include determining a required change in a transmit power level of the wireless transmitter based on the change in power level and the change in interference level at each of the set of sensors. The method may further include dynamically effecting a change in the transmit power of the wireless transmitter based on the required change.

In one embodiment, a system for dynamically controlling a transmit power of a wireless transmitter is disclosed. In one example, the system may include at least one processor and a memory communicatively coupled to the at least one processor. The memory may store processor-executable instructions, which, on execution, may cause the processor to determine a set of sensors based on a location of each of a plurality of sensors, a location of the wireless transmitter, and a maximum range of the wireless transmitter. The processor-executable instructions, on execution, may further cause the processor to determine a change in power level and a change in interference level at each of the set of sensors based on a plurality of power measurements and a plurality of interference measurements, within a predefined response time, for each of the set of sensors. The processor-executable instructions, on execution, may further cause the processor to determine a required change in a transmit power level of the wireless transmitter based on the change in power level and the change in interference level at each of the set of sensors. The processor-executable instructions, on execution, may further cause the processor to dynamically effect a change in the transmit power of the wireless transmitter based on the required change.

In one embodiment, a non-transitory computer-readable medium storing computer-executable instructions for dynamically controlling a transmit power of a wireless transmitter is disclosed. In one example, the stored instructions, when executed by a processor, may cause the processor to perform operations including determining a set of sensors based on a location of each of a plurality of sensors, a location of the wireless transmitter, and a maximum range of the wireless transmitter. The operations may further include determining a change in power level and a change in interference level at each of the set of sensors based on a plurality of power measurements and a plurality of interference measurements, within a predefined response time, for each of the set of sensors. The operations may further include determining a required change in a transmit power level of the wireless transmitter based on the change in power level and the change in interference level at each of the set of sensors. The operations may further include dynamically effecting a change in the transmit power of the wireless transmitter based on the required change.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
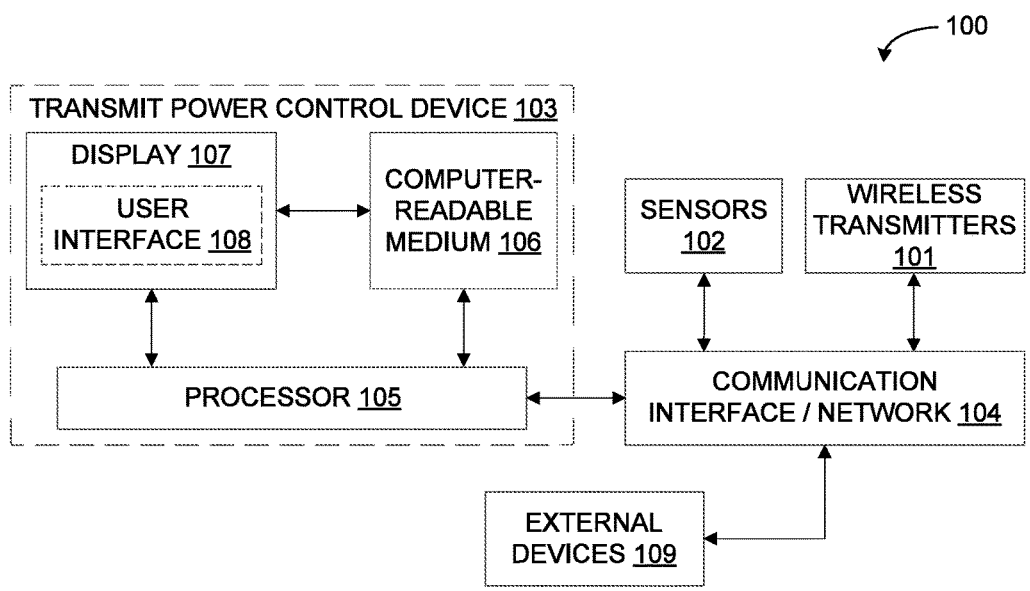
FIG. 1 is a block diagram of an exemplary system for dynamically controlling transmit power of a wireless transmitter in accordance with some embodiments of the present disclosure.

Referring now to FIG. 1, an exemplary system 100 for dynamically controlling transmit power of a wireless transmitter is illustrated in accordance with some embodiments of the present disclosure. The system may include a number of wireless transmitters 101 distributed over a region of interest (e.g., factory floor, large indoor space, etc.) so as to provide adequate coverage in the region of interest. In some embodiments, each of the wireless transmitters 101 may be a reconfigurable wireless transmitter module with or without inbuilt additional processing or communication capability. The system may further include a number of sensors 102 distributed over the region of interest. Each of the sensors 102 may be a reconfigurable wireless receiver module to periodically sample a spectrum at a band of interest, and estimate an average power and an average interference of the sampled spectrum.

The system 100 may further include a transmit power control device 103 (e.g., personal computer, laptop, server, or any other computing device) that implements a transmit power control engine for dynamically controlling transmit power of each of the wireless transmitters 101 in accordance with some embodiments of the present disclosure. Thus, each of the wireless transmitters 101 may interact with the transmit power control device 103 over a communication interface 104 so as to set its transmit power. Further, each of the sensors 102 may provide its location, and measured power and interference information to the transmit power control device 103 over the communication interface 104. In some embodiments, the sensors 102 may be a part of the transmit power control device 103.

The communication interface 104 may be wired or wireless, dedicated or multiple access interfaces between the wireless transmitters 101 and the transmit power control device 103, as well as between the sensors 102 and the transmit power control device 103. The communication interface 104 may employ various network level protocols or medium access protocols. For example, the network level protocol employed by the communication interface 104 may include, but may not be limited to, TCP/IP protocol. Additionally, for example, the medium access protocol may include, but may not be limited to, carrier sense multiple access (CSMA) protocol. In some embodiments, the interface between the wireless transmitters 101 and the transmit power control device 103 may be a human-in-loop (HIL) interface.

As will be described in greater detail below, the transmit power control device 103 may determine a set of sensors 102 based on a location of each of a plurality of sensors 102, a location of the wireless transmitter 101, and a maximum range of the wireless transmitter 101. The transmit power control device 103 may further determine a change in power level and a change in interference level at each of the set of sensors 102 based on a plurality of power measurements and a plurality of interference measurements, within a predefined response time, for each of the set of sensors 102. The transmit power control device 103 may further determine a required change in a transmit power level of the wireless transmitter 101 based on the change in power level and the change in interference level at each of the set of sensors 102, and dynamically effect a change in the transmit power of the wireless transmitter 101 based on the required change.

The transmit power control device 103 may include one or more processors 105 and a computer-readable medium (e.g., a memory) 106. The computer-readable storage medium 106 may store instructions that, when executed by the one or more processors 105, cause the one or more processors 105 to dynamically control transmit power of the wireless transmitter 101 in accordance with aspects of the present disclosure. The computer-readable storage medium 106 may also store various data (e.g., locations of sensors, locations of wireless transmitters, range of each wireless transmitter, set of sensors for each wireless transmitter, power measurements, interference measurements, change in power level, change in interference level, power and interference table, look-up or decision table, state table, etc.) that may be captured, processed, and/or required by the transmit power control device 103. In some embodiments, the transmit power control device 103 may also include a display 107. The transmit power control device 103 may interact with a user via a user interface 108 accessible via the display 107. The transmit power control device 103 may also interact with one or more external devices 109 over a wired or a wireless communication network 104 for sending or receiving various data. The external devices 109 may include, but are not limited to, a remote server, a digital device, or another computing system.

Figure 2:
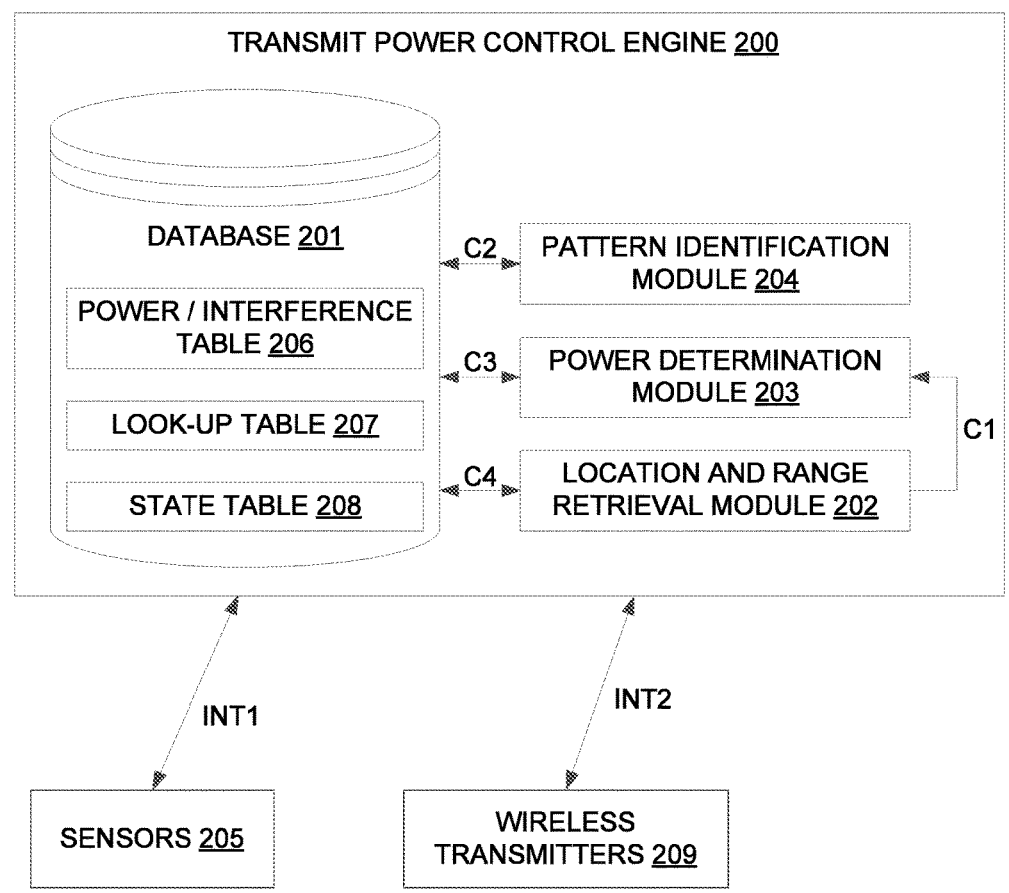
FIG. 2 is a functional block diagram of a transmit power control engine in accordance with some embodiments of the present disclosure.

Referring now to FIG. 2, a functional block diagram of a transmit power control engine 200 implemented by the transmit power control device 103 of FIG. 1 is illustrated in accordance with some embodiments of the present disclosure. The transmit power control engine 200 may be a computing engine, and may include various processing modules that perform various functions so as to dynamically control transmit power of the wireless transmitter. In some embodiments, the transmit power control engine 200 may include a database 201, a location and range retrieval module 202, a power determination module 203, and a pattern identification module 204.

The database 201 may be employed to store information received from the sensors 205 and various processing modules 202-204. In some embodiments, the database 201 may store the received information in the form of tables. For example, the database may include a power and interference table 206, a look-up or decision table 207, and a state table 208. The power and interference table 206 may include time of measurement, location of the sensor, measured power and interference information from the sensors 205. Each of the sensors 205 may write its location, and measured power and interference information into the power and interference table 206 via an INT1 communication interface. The look-up table 207 may include the transmit power determination decisions for a given combination of change in power and interference. In some embodiments, the look-up table 207 may be static and may include five fields: two sets of change in power and change in interference fields corresponding to a set of two sensors for any given transmitter, and a decision field for a corresponding decision. Further, in some embodiments, the look-up table 207 may be dynamic and may include additional fields such as time field for a time of implementing the decision, and a field for location of transmitter. The state stable 208 may include various combinations of change in power and interference that occur at each of the sensors 205. For example, in some embodiments, the state table 208 may include two sets of change in power and interference fields, a field for a time of change in power and interference, and a field for location of transmitter.

The location and range retrieval module 202 may retrieve the location and the maximum transmit range of each of the wireless transmitters 209 via an INT2 communication interface. The location and range retrieval module 202 may further determine a set of sensors corresponding to each of the wireless transmitters 209, and provide the same to the power determination module 203. The power determination module 203 may determine the change in transmit power of a wireless transmitter 209. Thus, each of the wireless transmitters 209 may interact with the power determination module 203 via the INT2 communication interface so as to set its transmit power. The pattern identification module 204 may perform analysis so as to identify patterns in the information contained in the state table 208.

As illustrated, C1 may be a connector between the location and range retrieval module 202 and the power determination module 203. Similarly, C2, C3, and C4 may be connectors between the database 201 and the pattern identification module 204, the power determination module 203, and the location and range retrieval module 202 respectively. As will be appreciated by those skilled in the art, C1, C2, C3, and C4 may be hardware or software connectors depending upon the realization. For example, various forms of software connectors may include, but may not be limited to, TCP/IP sockets, shared variables, and global variables. Further, for example, hardware connectors may include, but may not be limited to, hardware triggered interrupts.

As will be appreciated by those skilled in the art, all such aforementioned modules 202-204 may be represented as a single module or a combination of different modules. Further, as will be appreciated by those skilled in the art, each of the modules 202-204 may reside, in whole or in parts, on one device or multiple devices in communication with each other.

It should be noted that the transmit power control engine 200 may be implemented in programmable hardware devices such as programmable gate arrays, programmable array logic, programmable logic devices, and so forth. Alternatively, the transmit power control engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

As will be appreciated by one skilled in the art, a variety of processes may be employed for dynamically controlling transmit power of wireless transmitters. For example, the exemplary system 100 and the associated transmit power control engine 200 may dynamically control transmit power of wireless transmitters by the processes discussed herein. In particular, as will be appreciated by those of ordinary skill in the art, control logic and/or automated routines for performing the techniques and steps described herein may be implemented by the system 100 and the associated transmit power control engine 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 3:
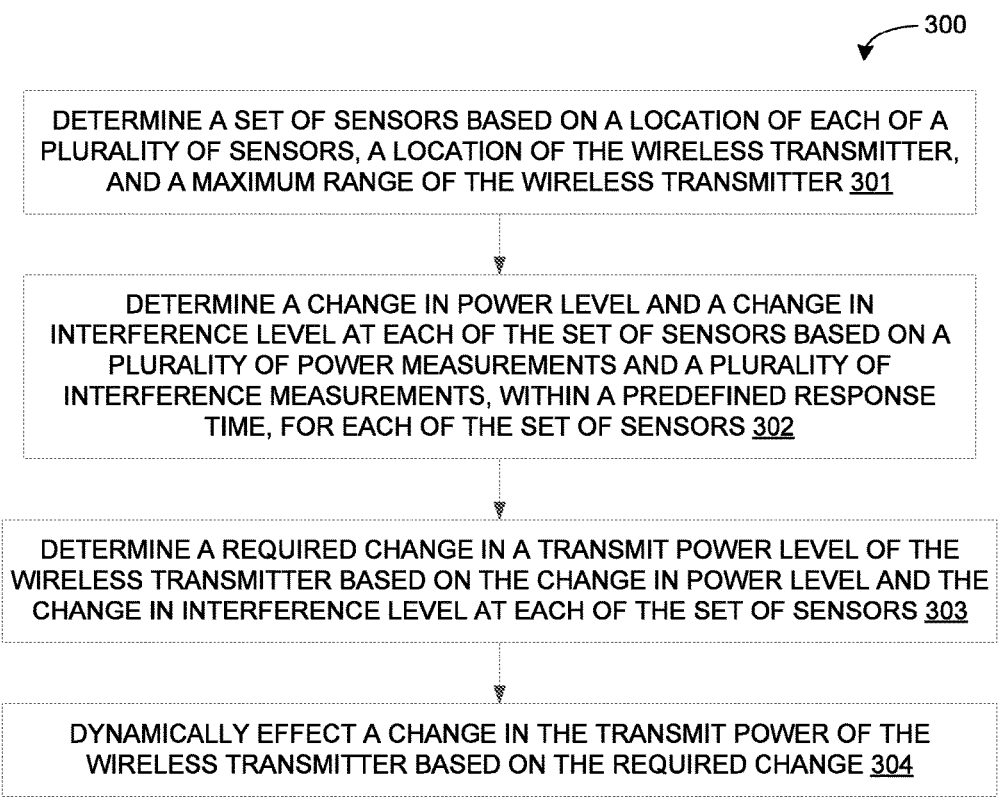
FIG. 3 is a flow diagram of an exemplary process for dynamically controlling transmit power of a wireless transmitter in accordance with some embodiments of the present disclosure.

For example, referring now to FIG. 3, exemplary control logic 300 for dynamically controlling a transmit power of a wireless transmitter via a system, such as system 100, is depicted via a flowchart in accordance with some embodiments of the present disclosure. As illustrated in the flowchart, the control logic 300 may include the steps of determining a set of sensors based on a location of each of a plurality of sensors, a location of the wireless transmitter, and a maximum range of the wireless transmitter at step 301, determining a change in power level and a change in interference level at each of the set of sensors based on a plurality of power measurements and a plurality of interference measurements, within a predefined response time, for each of the set of sensors at step 302, determining a required change in a transmit power level of the wireless transmitter based on the change in power level and the change in interference level at each of the set of sensors at step 303, and dynamically effecting a change in the transmit power of the wireless transmitter based on the required change at step 304.

In some embodiments, determining the set of sensors at step 301 may further include the steps of determining a distance between the wireless transmitter and each of the plurality of sensors, and selecting the set of sensors based on a minimum distance and a maximum distance within the maximum range of the wireless transmitter. Additionally, in some embodiments, determining the change in power level and the change in interference level at each of the set of sensors at step 302 may further include the steps of computing an average power measurement and an average interference measurement within the predefined response time, comparing the average power measurement with a set of power thresholds and the average interference measurement with a set of interference thresholds, and determining the change in power level and the change in interference level based on the comparison. It should be noted that, in some embodiments, the set of power thresholds and the set of interference thresholds may be determined based on at least one of maximum likelihood, receiver operating characteristics (ROC), or other change detection techniques.

In some embodiments, determining the required change in the transmit power level of the wireless transmitter at step 303 may include the step of referring to a predefined look-up table. Additionally, in some embodiments, the change in the transmit power of the wireless transmitter for the required change in transmit power level may be predefined or empirically determined.

In some embodiments, the control logic 300 may further include the step of updating a state table with the change in power level and the change in interference level at each of the set of sensors along with a time stamp and the location of the wireless transmitter. Additionally, in some embodiments, the control logic 300 may further include the step of analyzing the state table to identify at least one of a temporal pattern, and a spatial pattern. Further, in some embodiments, the control logic 300 may include the step of dynamically updating a predefined look-up table for the required change in transmit power level of the wireless transmitter based on the analysis. Moreover, in some embodiments, the control logic 300 may include the step of determining an optimal transmit power of the wireless transmitter based on a current transmit power of the wireless transmitter and a sum total of required changes in transmit power level of the wireless transmitter.

Figure 4:
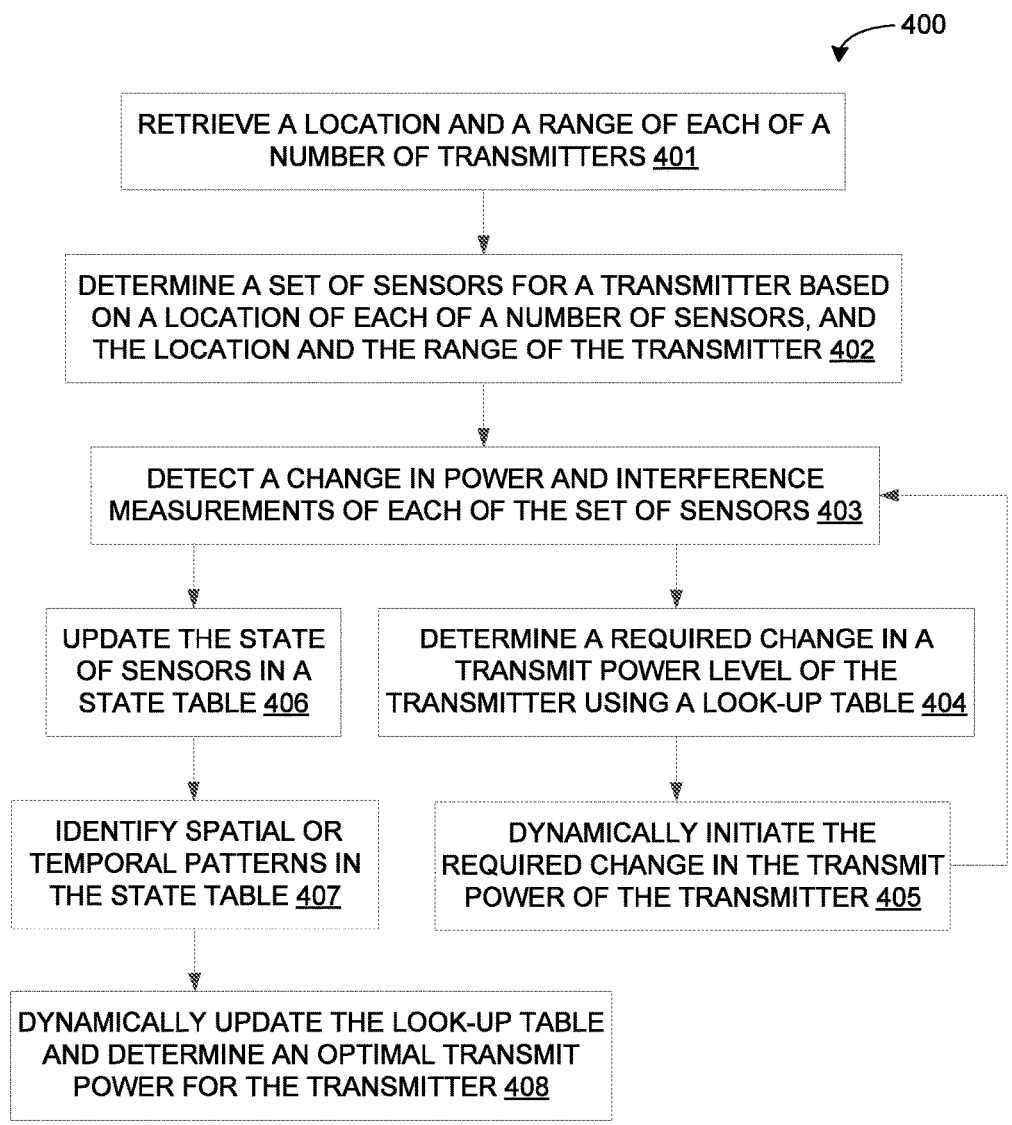
FIG. 4 is a flow diagram of a detailed exemplary process for dynamically controlling transmit power of a wireless transmitter in accordance with some embodiments of the present disclosure.

Referring now to FIG. 4, exemplary control logic 400 for dynamically controlling a transmit power of a wireless transmitter is depicted in greater detail via a flowchart in accordance with some embodiments of the present disclosure. As illustrated in the flowchart, at step 401, the control logic 400 may retrieve a location and a range of each of a number of wireless transmitters. The location and range retrieval module 202 in the transmit power control engine 200 may get the location and the maximum range from each of the wireless transmitters using the INT2 communication interface. It should be noted that, in some embodiments, the location of the wireless transmitter may be provided as (x, y) in Cartesian coordinates system. Further, the range of the wireless transmitter may be defined as a radius of a circular region, with the transmitter at the center, over which transmissions may be received without any error.

At step 402, the control logic 400 may determine a set of sensors for a transmitter based on a location of each of a number of sensors, and the location and the range of the transmitter. The location and range retrieval module 202 may connect to the database 201 using the C4 connector, and may retrieve location of each of the sensors from the power and interference table 206. By way of an example, in some embodiments, an exemplary power and interference table 206 is provided in Table A below:

TABLE A

| Time | Sensor Location (x, y) | Sensor ID (Optional) | Measured Power (Watt) | Measured Interference (Decibel) |
|---|---|---|---|---|
| 21:15.00 | (30, 40) | S1111 | 5 | 4 |
| 23:30.00 | (30, 40) | S1111 | 6 | 2 |
| 21:30:00 | (10, 20) | S2222 | 4 | 3 |

Further, for every sensor location in the power and interference table 206, the location and range retrieval module 202 may determine a distance between the wireless transmitter and the sensors as per equation (1) below:

$$Distance = |Sensor\ Location - Transmitter\ Location| \quad \text{Equation (1)}$$

The location and range retrieval module 202 may then determine a set of sensors for a wireless transmitter based on the determined distance with respect to the wireless transmitter and the maximum range of the wireless transmitter. For example, in some embodiments, the location and range retrieval module 202 may determine two sensors (i.e., sensor 1 and sensor 2) based on a minimum distance, and a maximum distance but within the maximum range of the wireless transmitter as per equations (2) and (3) below:

$$Sensor\ 1 = Sensor\ for\ which\ Distance\ is\ minimum \quad \text{Equation (2)}$$

$$Sensor\ 2 = Sensor\ for\ which\ Distance\ is\ maximum,\\ but\ less\ than\ or\ equal\ to\ maximum\ range\ of\ the\ transmitter \quad \text{Equation (3)}$$

The location and range retrieval module 202 may then pass the locations of each of the set of sensors (e.g., sensor 1 and sensor 2) to the power determination module 203 using the C1 connector. It should be noted that, in certain scenarios, more than one sensor may meet each of the sensor selection rules (i.e., equation (2) and equation (3)) described above. In such scenarios, the information from these sensors may be combined as will be described in detail below.

At step 403, the control logic 400 may detect a change in power and interference measurements of each of the set of sensors. The power determination module 203 may connect to the database 201 using the C3 connector, and may periodically read the power and interference measurements of each of the set of sensors (e.g., sensor 1 and sensor 2) from the power and the interference table 206. After making a predefined number of such readings within a response time, the power determination module 203 may determine a change in power level and a change in interference level at each of the set of sensors. It should be noted that the number of readings the power determination module 203 needs to make may be predefined based on the response time (i.e., how fast a change in power or interference needs to be detected). Further, it should be noted that the response time itself is predefined as a design parameter of the system.

In some embodiments, the power determination module 203 may compute an average power measurement and an average interference measurement within the predefined response time. The power determination module 203 may then compare the average power measurement with a set of power thresholds and the average interference measurement with a set of interference thresholds. The power determination module 203 may then determine the change in power level and the change in interference level based on the comparison.

By way of an example, the power determination module 203 may make four sets of measurements (i.e., power and interference measured by each of the two selected sensors) within the predefined response time. The power determination module 203 may then perform following steps for each of the four sets of measurements. First, the power determination module 203 may compute an average measurement of parameter (i.e., power, or interference) as per equation (4) below:

$$Average\ Measurement = (Sum\ of\ measurements)/\\ (Number\ of\ measurements) \quad \text{Equation (4)}$$

Second, the power determination module 203 may determine an increase in a level (i.e., change in level=1) of the parameter (i.e., power) if the average measurement is greater than or equal to a certain threshold (THigh), a decrease in the level (i.e., change in level=−1) of the parameter (i.e., power) if the average measurement is less than or equal to a certain threshold (TLow), or no change in the level (i.e., change in level=0) of the parameter (i.e., power) if the average measurement is between TLow and THigh. It should be noted that thresholds (i.e., THigh and TLow) for each of the parameter (i.e., power, or interference) may be determined using a variety of techniques including, but not limited to, maximum likelihood, receiver operating characteristics (ROC), or other change detection techniques. Similarly, the power determination module 203 may determine increase in a level (i.e., change in level=1) of the parameter (i.e., interference) if the average measurement is greater than or equal to a certain threshold (T), or no change or a decrease in the level (i.e., change in level=0) of the parameter (i.e., interference) if the average measurement is less than the certain threshold (T). In other words, the power determination module 203 may detect either a presence or an absence of interference beyond the certain threshold (T). Thus, the power determination module 203 may determine a set of four change in the levels corresponding to change in the power level and the change in interference level for each of the two selected sensors (i.e., sensor 1 and sensor 2). The set of four change levels, corresponding to change in power level at each of the two sensors (S1, S2) and to change in interference level at each of the two sensors (R1, R2), may also be referred to as a state of the wireless transmitter.

Further, as stated above, in certain scenarios, more than one sensor may meet each of the sensor selection rules and the information from these sensors may, therefore, be combined. For example, in some embodiments, the change in interference level at each of the sensors meeting sensor selection rules may be combined using a Boolean OR operation. For example, the change in interference level detected at each of n sensors, which meet the sensor selection rules, may be R1, R2 . . . Rn respectively. Thus, the combined change in interference level may be R1 OR R2 . . . OR Rn. The logic behind this is that even if one of these sensors detects interference (R=1), then the combined change in interference level should be 1. Similarly, for example, in some embodiments, the change in power level at each of the sensors meeting sensor selection rules may be combined using a majority operation. In other words, the combined change in power value would be the value that occurs the most number of times. Thus, if {1, 1, −1, −1, −1} are the set of change in power levels corresponding to the 5 sensors, which meet the sensor selection rules, then the combined change in power level may be −1

At step 404, the control logic 400 may determine a required change in a transmit power level of the wireless transmitter based on the change in power level and the change in interference level at each of the set of sensors. The power determination module 203 may connect to the database 201 using the C3 connector, and may access the look-up table 207. By way of an example, in some embodiments, an exemplary look-up table 207 is provided in Table B below:

TABLE B

| S1 | R1 | S2 | R2 | Decision | S1 | R1 | S2 | R2 | Decision | S1 | R1 | S2 | R2 | Decision |
|----|----|----|----|----------|----|----|----|----|----------|----|----|----|----|----------|
| −1 | 0 | −1 | 0 | 0.1 | −1 | 1 | −1 | 0 | −1 | 0 | 0 | −1 | 0 | 0 |
| −1 | 0 | −1 | 1 | −1 | −1 | 1 | −1 | 1 | −1 | 0 | 0 | −1 | 1 | −1 |
| −1 | 0 | 0 | 0 | 1 | −1 | 1 | 0 | 0 | −1 | 0 | 0 | 0 | 0 | 0 |
| −1 | 0 | 0 | 1 | −1 | −1 | 1 | 0 | 1 | −1 | 0 | 0 | 0 | 1 | −1 |
| −1 | 0 | 1 | 0 | 0 | −1 | 1 | 1 | 0 | −1 | 0 | 0 | 1 | 0 | 0 |
| −1 | 0 | 1 | 1 | −1 | −1 | 1 | 1 | 1 | −1 | 0 | 0 | 1 | 1 | −1 |
| 0 | 1 | −1 | 0 | −1 | 1 | 0 | −1 | 0 | 0 | 1 | 1 | −1 | 0 | −1 |
| 0 | 1 | −1 | 1 | −1 | 1 | 0 | −1 | 1 | −1 | 1 | 1 | −1 | 1 | −1 |
| 0 | 1 | 0 | 0 | −1 | 1 | 0 | 0 | 0 | 0 | 1 | 1 | 0 | 0 | −1 |
| 0 | 1 | 0 | 1 | −1 | 1 | 0 | 0 | 1 | −1 | 1 | 1 | 0 | 1 | −1 |
| 0 | 1 | 1 | 0 | −1 | 1 | 0 | 1 | 0 | 0, −1 | 1 | 1 | 1 | 0 | −1 |
| 0 | 1 | 1 | 1 | −1 | 1 | 0 | 1 | 1 | −1 | 1 | 1 | 1 | 1 | −1 |

The power determination module 203 may then determine the required change in the transmit power level of the wireless transmitter using the look-up table 207. In particular, the power determination module 203 may search the two sets of power and interference fields in the look-up table 207 that matches with the determined state (i.e., S1, R1, S2, R2 values) of the wireless transmitter. Upon identifying a match, the power determination module 203 may read the corresponding decision field in the look-up table 207 so as to determine a required change in a transmit power level of the wireless transmitter. For example, if the determined state is {1, 0, −1, 1}, then the decision would be −1 (i.e., decrease power by one level) as per Table B. It should be noted that, in some embodiments, the change in transmit power level is with respect to the current transmit power.

At step 405, the control logic 400 may dynamically effect a change in the transmit power of the wireless transmitter based on the required change in the transmit power level. The power determination module 203 may initiate the required change in the transmit power of the wireless transmitter by sending the decision (i.e., required change in the transmit power level) to the wireless transmitter using the INT2 communication interface. It should be noted that an actual change in the transmit power of the wireless transmitter corresponding to the required change in transmit power level may be predefined or empirically determined. For example, in some embodiments, the incremental transmit power level may be hardware specific power level. Further, the control logic 400 in general, and the power determination module 203 in particular, may repeat the steps of 403, 404, and 405 so as to dynamically control the transmit power of the wireless transmitters.

Additionally, at step 406, the control logic 400 may update the state of sensors in the state table 208. The power determination module 203 may save the determined state of selected sensors for each of the wireless transmitter along with a time-stamp and location of the wireless transmitter in the state table 208 using the C3 connector. It should be noted that the time-stamp may be time captured at the moment of creating a database record, and may be included as a field in the record itself. By way of an example, in some embodiments, an exemplary state table 208 is provided in Table C below:

TABLE C

| Time | Transmitter Location (x, y) | Transmitter ID (Optional) | Change in Power at Sensor 1 (S1) | Change in Interference at Sensor 1 (R1) | Change in Power at Sensor 2 (S2) | Change in Interference at Sensor 2 (R2) |
|---|---|---|---|---|---|---|
| 09:10.00 | (50, 60) | T1 | | | | |
| 10:30.00 | (20, 30) | T2 | | | | |
| 19:45:00 | (90, 0) | T3 | | | | |

At step 407, the control logic 400 may identify spatial or temporal patterns in the state table 208. The pattern identification module 204 may connect to the database 201 using the C2 connector, and may access the state table 208. The pattern identification module 204 may then analyze the time-stamps, locations of the transmitters, and states of the corresponding sensors in the state table 208 to infer spatial or temporal patterns. The pattern identification module 204 may employ any machine learning algorithm to identify patterns over a period of time. It should be noted that temporal patterns may be for individual wireless transmitter while the spatial patterns may be for a group of wireless transmitters. For example, if, over a period of time (e.g. days), a sequence of state transitions are observed to occur at a particular time (e.g. 1 pm) for a particular transmitter, then this pattern may be inferred to occur periodically (e.g. 1 pm every day), and a direct state transition from the first state to the last state may be learned for the particular wireless transmitter based on the temporal pattern. As will be appreciated by those skilled in the art, such learning may result in a reduction in the number of intermediate steps required to reach the desired power level, thereby resulting in optimum power for a given transmitter and minimum interference to other transmitters. Further, it should be noted that inference of spatial patterns may require temporal pattern inferences to have occurred first. For example, if, over a period of time (e.g. days), a group of transmitters are observed to transition from one state to another at a particular time (e.g. 1 pm), then this entire set of state transmissions may be inferred to occur periodically (e.g. 1 pm every day), and the spatial distribution of states and their transitions may be learned. Again, as will be appreciated by those skilled in the art, such learning may result in optimization of computing required by the transmit power control device. Further, as will be appreciated by those skilled in the art, the examples provided above are for illustrative purposes only, and the control logic is not limited to these instances.

At step 408, the control logic 400 may dynamically update the look-up table 207 and determine an optimal transmit power for the wireless transmitter. The pattern identification module 204 may dynamically update the decisions in the look-up table 207, using the connector C2, based on the inferences made in step 407. It should be noted that, the dynamically updated look-up table 207 may include additional fields for time and wireless transmitter location so as to accommodate temporal and spatial inferences. Thus, initially the look-up table 207 may be static with decision field corresponding to the power change levels and interference change levels of the selected sensors. However, as and when the patterns are identified by the pattern identification module 204, the look-up table 207 may be dynamically updated to include time and wireless transmitter location fields, and become time and location specific. Further, it should be noted that, if the rules in the dynamically updated look-up table 207 lead to unexpected interference on increase in a transmitter's power, or a decrease in a transmitter's power without increase in power at transmitters in its vicinity, then the transmit power control device may revert back to the static look-up table 207. In other words, a feedback mechanism may be implemented by the transmit power control device so as to refer between the dynamically updated look-up table 207 or the static look-up table 207 for the decision making.

Additionally, the pattern identification module 204 may determine the optimal transmit power for the wireless transmitter. In some embodiments, the pattern identification module 204 may determine the optimal transmit power of the wireless transmitter based on a current transmit power of the wireless transmitter and a sum total of required changes in transmit power level of the wireless transmitter as per equation (5) below:

The optimal transmit power=current transmit power+ sum of $n$ incremental power level   Equation (5)

Thus, for every state (i.e. the {S1, R1, S2, R2} set) that may lead to multiple state transitions, the pattern identification module 204 may combine multiple state transitions into a single one, and update the decision field of the look-up table 207 to (+) or (−) n, where n is the number of state transitions to be combined. For example, if two state transitions involving increase in power at each step are to be combined, then a decision of "2" may be output. Similarly, for decrease in power, a negative sign may be included. By way of another example, in the representative state table provided in Table D below, change in power level from Low to High may be achieved in two steps and five state transitions. However, if there is a recurring pattern, these may be combined into one step and two state transitions.

TABLE D

| S1 | R1 | S2 | R2 | Power Level | S1 |
|---|---|---|---|---|---|
| −1 | 0 | −1 | 0 | Low | 1 |
| 0 | 0 | −1 | 0 | Medium | 0 |
| 0 | 0 | 0 | 0 | Medium | 0 |
| −1 | 0 | −1 | 0 | Medium | 1 |
| 0 | 0 | −1 | 0 | High | 0 |
| 0 | 0 | 0 | 0 | High | 0 |

As will be appreciated, upon identification of the patterns and generation of the dynamically updated look-up table 207, the power determination module 203 may perform steps 403, 404, and 405 based on the dynamically updated look-up table 207 so as to dynamically control the transmit power of the wireless transmitter. Thus, the power determination module 203 may detect a change in power and interference measurements of each of the set of sensors, compare the current state against the set of values in the dynamically updated look-up table 207, and select the optimized decision. The power determination module 203 may then send the decision to the wireless transmitter using INT2 communication interface, and save the current state along with a time-stamp and the wireless transmitter location in the state table 208.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will be appreciated by those skilled in the art, the techniques described in the various embodiments discussed above provide for efficient, effective, and scalable mechanism to dynamically control transmit power of the wireless transmitter. In particular, the techniques provide for dynamically control transmit power of the wireless transmitter in an indoor environment using a decision table (i.e., look-up table). The techniques require a minimum number of sensors per transmitter (e.g., only two sensors per transmitter may be required), thereby addressing issue of sparse distribution of sensors and reducing cost. The techniques described in embodiments discussed above may be implemented in a variety of settings. For example, the technique may be useful to automobile and aircraft industry requiring factory floor spectrum reuse. Further, the technique may be useful to telecom industry requiring indoor spectrum reuse and transmitter range determination.

Further, as will be appreciated by those skilled in the art, the techniques described in the various embodiments discussed above further provide for a learning system that dynamically identify power and interference patterns, and dynamically update the decision table according to the identified power and interference patterns. The dynamic update of the decision table may result in a reduction in the number of intermediate steps required to reach the desired power level, thereby resulting in optimum power for a given transmitter and minimum interference to other transmitters. Further, the spatial pattern identification may result in reduced computing effort per wireless transmitter.

The specification has described method and system for dynamically controlling transmit power of a wireless transmitter. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of dynamically controlling a transmit power of a wireless transmitter, the method comprising:
   determining, by a transmit power control device, a set of sensors based on a location of each of a plurality of sensors, a location of the wireless transmitter, and a maximum range of the wireless transmitter;
   determining, by the transmit power control device, a change in power level and a change in interference level at each of the set of sensors based on a plurality of power measurements and a plurality of interference measurements, within a predefined response time, for each of the set of sensors, wherein the determining the change in power level and the change in interference level at each of the set of sensors comprises:
      computing an average power measurement and an average interference measurement within the predefined response time;
      comparing the average power measurement with a set of power thresholds and the average interference measurement with a set of interference thresholds; and
      determining the change in power level and the change in interference level based on the comparison;
   determining, by the transmit power control device, a required change in a transmit power level of the wireless transmitter based on the change in power level and the change in interference level at each of the set of sensors; and
   dynamically effecting, by the transmit power control device, a change in the transmit power of the wireless transmitter based on the required change.

2. The method of claim 1, wherein the determining the set of sensors comprises:
   determining a distance between the wireless transmitter and each of the plurality of sensors; and
   selecting the set of sensors based on a minimum distance and a maximum distance within the maximum range of the wireless transmitter.

3. The method of claim 1, wherein the set of power thresholds and the set of interference thresholds are determined based on at least one of maximum likelihood, receiver operating characteristics (ROC), or other change detection techniques.

4. The method of claim 1, wherein the determining the required change in the transmit power level of the wireless transmitter comprises referring to a predefined look-up table.

5. The method of claim 1, wherein the change in the transmit power of the wireless transmitter for the required change in transmit power level is predefined or empirically determined.

6. The method of claim 1, further comprising updating a state table with the change in power level and the change in interference level at each of the set of sensors along with a time stamp and the location of the wireless transmitter.

7. The method of claim 6, further comprising analyzing the state table to identify at least one of a temporal pattern or a spatial pattern.

8. The method of claim 7, further comprising dynamically updating a predefined look-up table for the required change in transmit power level of the wireless transmitter based on the analysis.

9. The method of claim 8, further comprising determining an optimal transmit power of the wireless transmitter based on a current transmit power of the wireless transmitter and a sum total of required changes in transmit power level of the wireless transmitter.

10. A system for dynamically controlling a transmit power of a wireless transmitter, the system comprising:
   a transmit power control device comprising at least one processor and a computer-readable medium storing instructions that, when executed by the at least one processor, cause the at least one processor to perform operations comprising:

determining a set of sensors based on a location of each of a plurality of sensors, a location of the wireless transmitter, and a maximum range of the wireless transmitter;

determining a change in power level and a change in interference level at each of the set of sensors based on a plurality of power measurements and a plurality of interference measurements, within a predefined response time, for each of the set of sensors, wherein the determining the change in power level and the change in interference level at each of the set of sensors comprises:

computing an average power measurement and an average interference measurement within the predefined response time;

comparing the average power measurement with a set of power thresholds and the average interference measurement with a set of interference thresholds; and determining the change in power level and the change in interference level based on the comparison;

determining a required change in a transmit power level of the wireless transmitter based on the change in power level and the change in interference level at each of the set of sensors; and dynamically effecting a change in the transmit power of the wireless transmitter based on the required change.

11. The system of claim 10, wherein the determining the set of sensors comprises:
determining a distance between the wireless transmitter and each of the plurality of sensors; and
selecting the set of sensors based on a minimum distance and a maximum distance within the maximum range of the wireless transmitter.

12. The system of claim 10, wherein the determining the required change in the transmit power level of the wireless transmitter comprises referring to a predefined look-up table.

13. The system of claim 10, wherein the operations further comprise:
updating a state table with the change in power level and the change in interference level at each of the set of sensors along with a time stamp and the location of the wireless transmitter;
analyzing the state table to identify at least one of a temporal pattern or a spatial pattern; and
dynamically updating a predefined look-up table for the required change in transmit power level of the wireless transmitter based on the analysis.

14. A non-transitory computer-readable medium storing computer-executable instructions for:
determining a set of sensors based on a location of each of a plurality of sensors, a location of the wireless transmitter, and a maximum range of the wireless transmitter;

determining a change in power level and a change in interference level at each of the set of sensors based on a plurality of power measurements and a plurality of interference measurements, within a predefined response time, for each of the set of sensors, wherein the determining the change in power level and the change in interference level at each of the set of sensors comprises:

computing an average power measurement and an average interference measurement within the predefined response time;

comparing the average power measurement with a set of power thresholds and the average interference measurement with a set of interference thresholds; and determining the change in power level and the change in interference level based on the comparison;

determining a required change in a transmit power level of the wireless transmitter based on the change in power level and the change in interference level at each of the set of sensors; and dynamically effecting a change in the transmit power of the wireless transmitter based on the required change.

15. The non-transitory computer-readable medium of claim 14, wherein the determining the set of sensors comprises:
determining a distance between the wireless transmitter and each of the plurality of sensors; and
selecting the set of sensors based on a minimum distance and a maximum distance within the maximum range of the wireless transmitter.

16. The non-transitory computer-readable medium of claim 14, wherein the determining the required change in the transmit power level of the wireless transmitter comprises referring to a predefined look-up table.

17. The non-transitory computer-readable medium of claim 14, further storing computer-executable instructions for:
updating a state table with the change in power level and the change in interference level at each of the set of sensors along with a time stamp and the location of the wireless transmitter;
analyzing the state table to identify at least one of a temporal pattern or a spatial pattern; and
dynamically updating a predefined look-up table for the required change in transmit power level of the wireless transmitter based on the analysis.

* * * * *